(12) United States Patent
Kiple et al.

(10) Patent No.: US 7,403,374 B2
(45) Date of Patent: Jul. 22, 2008

(54) INTEGRATED ROTATABLE SUPPORT FOR A COMMUNICATIONS DEVICE

(75) Inventors: Jean Kiple, Lake Villa, IL (US); Clifford Krapfl, Chicago, IL (US)

(73) Assignee: Arris Group, Inc., Suwanee, GA (US)

( * ) Notice: Subject to any disclaimer, the term of this patent is extended or adjusted under 35 U.S.C. 154(b) by 348 days.

(21) Appl. No.: 11/031,773

(22) Filed: Jan. 7, 2005

(65) Prior Publication Data

US 2005/0167566 A1 Aug. 4, 2005

Related U.S. Application Data

(60) Provisional application No. 60/535,257, filed on Jan. 9, 2004.

(51) Int. Cl.
*G06F 1/16* (2006.01)

(52) U.S. Cl. ............ 361/681; 248/278.1; 16/333; 701/220

(58) Field of Classification Search .......... 248/677, 248/289.11, 278.1; 174/50; 701/220; 16/324, 16/333; 361/679–687, 724–727
See application file for complete search history.

(56) References Cited

U.S. PATENT DOCUMENTS

| | | | | |
|---|---|---|---|---|
| 3,973,501 A | * | 8/1976 | Briggs | 102/224 |
| 4,831,736 A | * | 5/1989 | Bryant, Sr. | 33/1 M |
| 6,517,040 B1 | * | 2/2003 | Wen | 248/278.1 |
| 2004/0020675 A1 | * | 2/2004 | Bally et al. | 174/50 |
| 2005/0137000 A1 | * | 6/2005 | Toh et al. | 455/575.4 |

* cited by examiner

*Primary Examiner*—Hung V Duong
(74) *Attorney, Agent, or Firm*—John L. Doughty

(57) ABSTRACT

A spring-loaded rotatable support integrated into the end of a cable modem housing can be deployed to prevent tipping of the modem housing when it is placed in the vertical position, and stowed to allow placement of the modem in a horizontal position. The support is formed so that its ends are shaped similarly to the front edge of the modem near the bottom end where the support is located. Thus, when the support is stowed, it blends into the overall shape of the modem, facilitating horizontal modem-placement and does not detract from the aesthetics of the modem. The support is shrouded at the rear of the bottom end to the extent that the support extends from the bottom end to provide level support.

8 Claims, 3 Drawing Sheets

STOWED POSITION

DEPLOYED POSITION

US 7,403,374 B2

INTEGRATED ROTATABLE SUPPORT FOR A COMMUNICATIONS DEVICE

CROSS REFERENCE TO RELATED APPLICATION

This application priority under 35 U.S.C. 119(e) to Kiple, U.S. provisional patent application No. 60/535,257 entitled "INTEGRATED ROTATABLE SUPPORT FOR A COMMUNICATIONS DEVICE," which was filed Jan. 9, 2004, and is incorporated herein by reference in its entirety.

FIELD OF THE INVENTION

The present invention relates generally to video and broadband communication networks, and more particularly to support for a communication device.

BACKGROUND

Community antenna television ("CATV") networks have been used for more then four decades to deliver television programming to a large number of subscribers. The CATV networks have typically been implemented using coaxial cables that form a network for electrically providing a signal path for video signals.

In addition to providing analog, and more recently digital, video broadcast television signals, cable service providers are increasingly adding broadband data services to their offerings to customers. These data services typically include Internet access using the Data Over Cable Service Interface Specification ("DOCSIS") protocol. To provide television and data services, a service provider typically uses a cable modem termination system ("CMTS") for the data services and a quadrature amplitude modulation ("QAM") multiplexer for downstream broadcast television, narrowcast and video on demand ("VoD") traffic signals.

Cable modems used in a consumer environment are typically external devices that connect to a personal computer via a data connection, such as, for example, a USB port connection or an Ethernet port connection. Although a cable modem is primarily purchased for its utility in allowing the personal computer to access a broadband network, it is desirable that the cable modem be aesthetically pleasing as well. As such, in addition to designing the housing of an external device, such as a modem, to embodiment a stylish shape, it should also integrate into its surroundings as well. This includes placement on a desktop.

Modems typically have rectangular shaped sides with a depth dimension chosen to just accommodate the modem circuitry, which is typically contained on a single circuit board. These housings may be installed such that they lie horizontally on one of their relatively large rectangular sides as opposed to vertically on one of their relatively small ends. The terms 'relatively large' and 'relatively small' are used to compare the desktop footprint covered when in a given position with the height of the housing when in that same given position. For example, when a modem lies flat on its large rectangular side, either side dimension is large compared to the height. Thus, the modem housing is stable and does not tip over. However, if placement on one of its ends is desired by a user, then either dimension of the end on which the modem rests is small compared to the height of the housing. Thus, the modem housing tends to tip.

To facilitate vertical use, a modem may be placed onto a support or supports, either separate from or fixed as a part of the modem, that effectively extend the footprint dimension so that they are larger compared to the distance above the desktop of the center of mass of the modem. Thus, tipping is better resisted and the housing is more stable.

Although using additional supports, or other similar means, may enhance resistance to tipping when a modem is placed in a vertical position, separate supports may get lost and fixed supports that may be molded as part of the modem housing, prevent horizontal placement.

Thus, there is a need for a system that provides resistance to tipping when a modem is placed in a vertical position, and allows the modem to be used in a horizontal position without the supports becoming lost.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. This disclosure is not intended nor is to be construed to limit the present invention or otherwise to exclude other embodiments, adaptations, variations, modifications and equivalent arrangements, the present invention being limited only by the claims appended hereto and the equivalents thereof.

Figure 1:
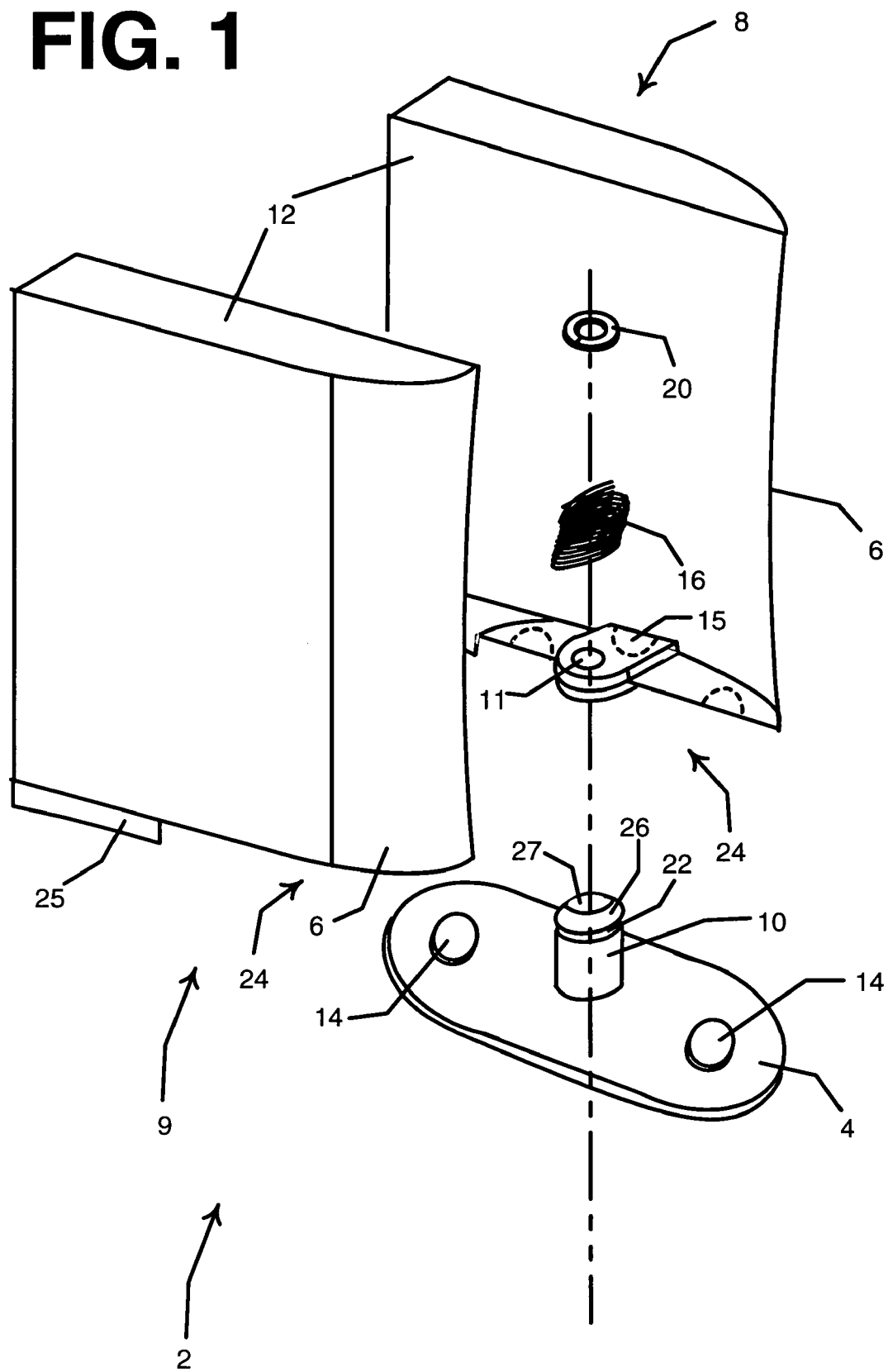
FIG. 1 illustrates an exploded view of a cable modem with a rotatable support in a stowed position.
Figure 2:
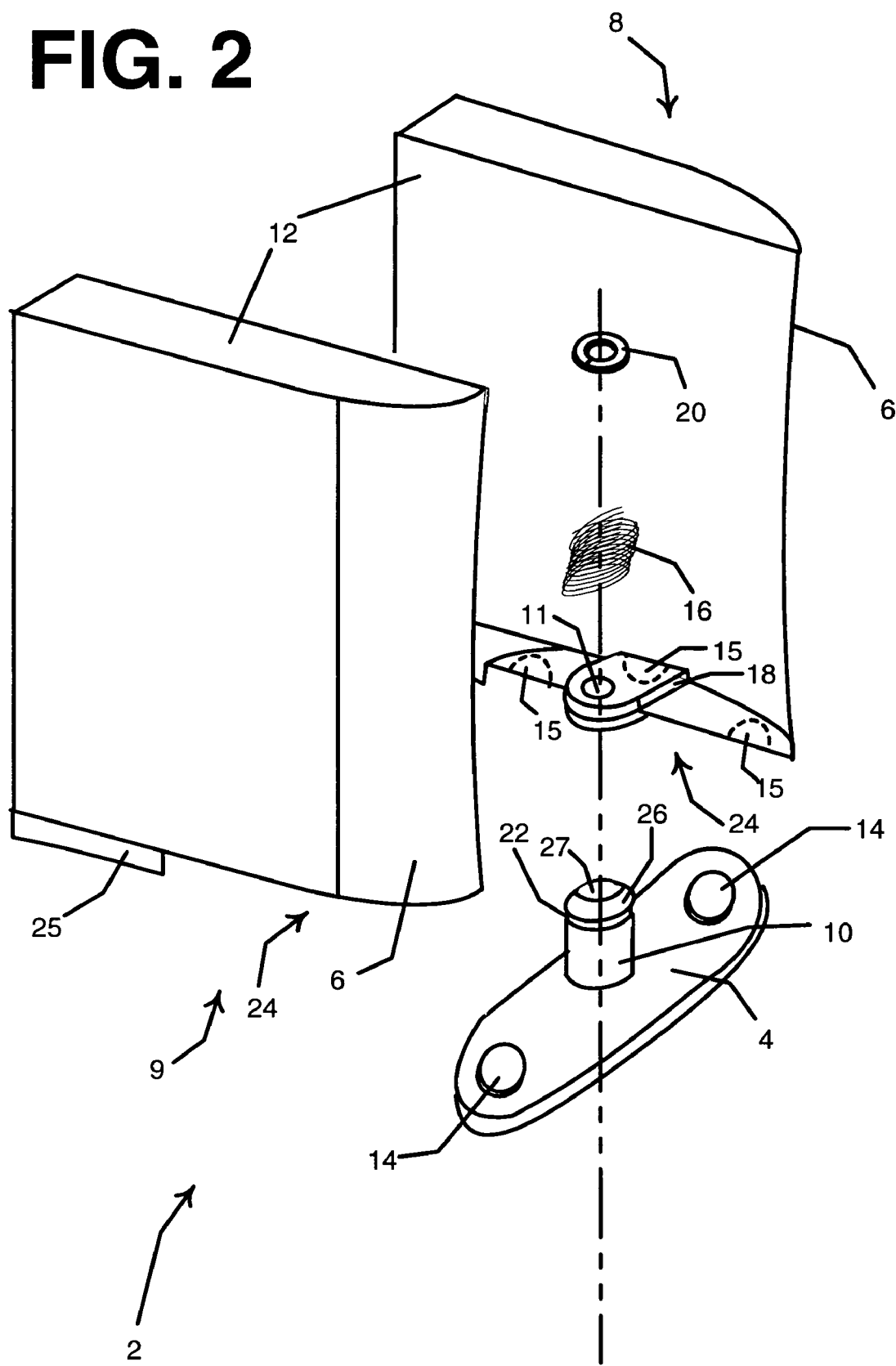
FIG. 2 illustrates an exploded view of a cable modem with a rotatable support in a deployed position.

Turning now to the figures, FIG. 1 illustrates an exploded view of a cable modem 2 having a rotatable support 4. Support 4 may be shaped with ends shaped to match the cross sectional shape of the front portion 6 of modem 2 as viewed from the top 8 of the modem, wherein the top of the modem is the end opposite the support end 9. Thus, if a user wishes to use the modem 2 laying flat/horizontal, with the large surfaces being perpendicular to gravitational force, support 4 may be rotated into a stowed position such that its shape conforms to the shape of the support end of the modem. If a user wishes to use modem 2 in an upright, or vertical, position (where the top 8 and support end 9 surfaces are perpendicular to gravitational forces, support 4 may be deployed as depicted in FIG. 2. Support 4 opposes side-to-side tipping forces to maintain modem 2 in an upright position.

Support 4 may rotate on axle 10, the axle bearing against a bearing surface 11 that is preferably defined by the housing 12 (preferably a two-piece structure as shown in the figure) of modem 2. Detents, which facilitate support 4 staying in either a deployed or stowed position, may have a completely circular outline, or semicircular outline. For example, detents 15 that lie on the lower plane of housing 12, said front-to-back housing separating two halves of housing 12 shown in the figure, may be semicircular in either housing half so that when the halves mate with one another, a complete circle results. It will be appreciated that other shapes for the detents, and the dowels that interface with them, may be implemented.

To stabilize the position of support 4, dowel tabs 14 are designed to fit recessed detents 15, which are shown by dashed lines in FIGS. 1 and 2. Exertion means 16, preferably a spring, or other article having elasticity so that it functions as a spring, is located inside the housing 12 of modem 2 to provide continuous biasing force to support 4. Exertion means 16 exerts force against the inside of the floor of modem 2, preferably at boss 18, and against retaining clip 20, which is secured to axle 10 in retaining groove 22. Accordingly, exertion means 16 exerts force against support 4, because the support is coupled to axle 10, thereby urging the support towards the floor of modem 2. This biasing force facilitates retaining dowels 14 being forcibly placed into detents 15 such that support 4 can be securely retained in the deployed position as shown in FIG. 2 and the stowed position as shown in FIG. 1, in which the modem 2 is typically intended for use in a horizontal position on a desk top.

In either the stowed position illustrated in FIG. 1, or the deployed position shown in FIG. 2, support 4 rotates within recessed storage area 24, which is defined in housing halves 12. Thus, when either stowed or deployed, the thickness of support 4 is approximately the same as the extent of stationary support 25 at the back of modem 2. This facilitates housing 12 being level when support 4 is deployed, and provides a smooth, continuous end when which visually enhances external aesthetics of the housing when placed in the horizontal position. Stationary support 25 may be defined by housing halves 12 only at the exterior extent of the housing halves or may be solid from the external extent of one housing half to the external extent of the other. It will be appreciated that stationary support 25 may take on other forms, such as an 'X' shape between external support skirts formed at the housing's exterior.

Retaining groove 22 may be formed into axle 10 such that ring 20 is retained onto axle shaft 10. In such an embodiment, ring 20 is preferably a split ring so that it can be mounted to the axle after spring 16 has been installed. Alternatively, ring 20 may be secured to axle 10 with elastic securing ring 26. In this embodiment, following installation of spring 16, retaining ring 20 may be slipped over the distal end 27 of axle 10 and elastic securing ring 26, which preferably has a smaller inner diameter that does the diameter of the axle's distal end, can be stretched over the tip of axle 10 so that retaining ring is secured firmly to resist the biasing force of spring 16. It will be appreciated that other means for retaining and opposing the force of biasing means 16 may include a press fit end that is installed after the biasing means, or an end that is pinned to axle 10.

Figure 3:
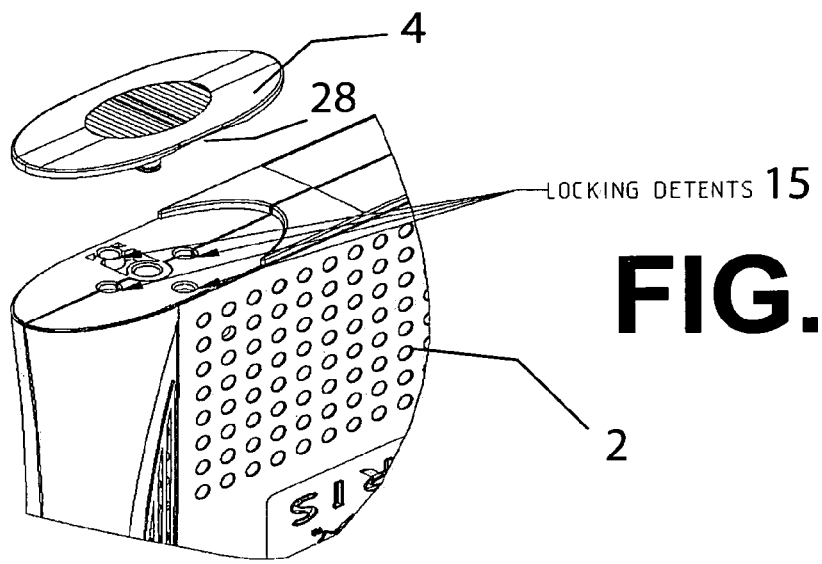
FIG. 3 illustrates a bottom view of a modem with a rotatable support detached.

FIG. 3 illustrates the detents 15 for interfacing locating dowels 14 shown in FIGS. 1 and 2 that locate support 4 in a desired position. It is noted that the centers of detents 15 are preferably placed equidistant from one another and equidistant from the axis of bearing 11 and axle 10 such that two dowel tabs 14 interface with the stowed detents and the deployed detents, as shown in FIGS. 1 and 2.

Support 4 may define grips 28 to facilitate gripping the support and drawing it away from modem 2 while opposing the force of biasing means 16 as shown in FIGS. 1 and 2. Grips 28 are preferably beveled—with the beveled surface facing the modem—to allow one's fingers to more strongly grip support 4 than if there were no grips present.

Figure 4:
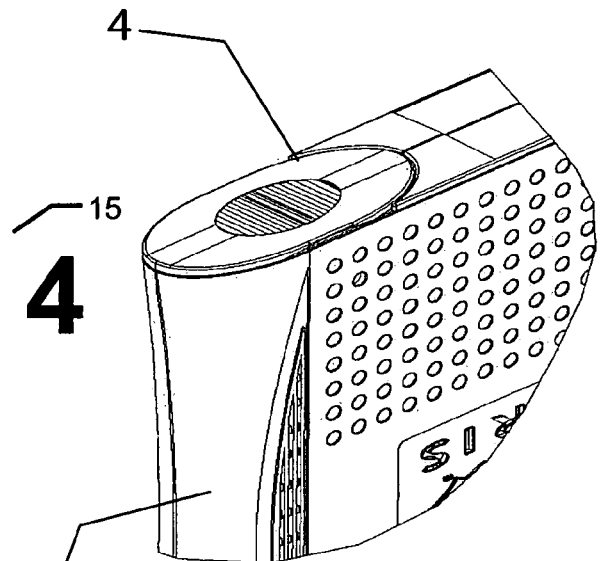
FIG. 4 illustrates a bottom view of a modem with a rotatable support stowed.

FIG. 4 illustrates support 4 in a stowed position. This position is typically for horizontal use of modem 2.

Figure 5:
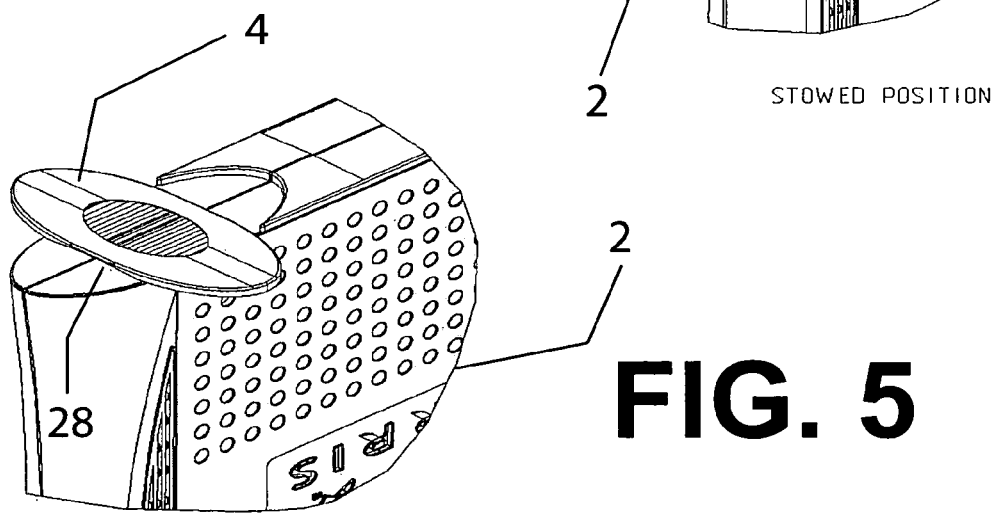
FIG. 5 illustrates a bottom view of a modem with a rotatable support deployed.

FIG. 5 illustrates support 4 in a deployed position. This position is typically for vertical use of modem 2. Grips 28 facilitate raising support 4 against the force of the biasing means to remove dowels from deployed detents so that the support can rotate between stowed and deployed positions.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

We claim:

1. A system for supporting a communication device housing, comprising:
    a rotatable support means for preventing tipping of the communication device;
    a biasing means for urging the support means against a support side of the device housing; and
    a retaining means coupled to the axle shaft for opposing the biasing means' urging force.

2. The system of claim 1 wherein the rotatable support means includes an axle having a support end and a distal end.

3. The system of claim 2 wherein the housing defines a bearing through which the axle shaft passes such that the retaining means causes the biasing means to be urged against a biasing means side of the bearing.

4. The system of claim 2 wherein the support means is planar and wherein the axle projects therefrom with the axle's centerline projects perpendicularly therefrom from the centroid of the plane.

5. The system of claim 2 wherein the axle includes an annular groove at the distal end.

6. The system of claim 1 wherein the biasing means is a spring.

7. The system of claim 6 wherein the retaining means is a clip retained on the axle at the annular groove.

8. The system of claim 1 wherein the housing defines a stationary support that cooperates with the rotatable support means to prevent tipping of the device housing when the housing is in an upright orientation.

* * * * *